United States Patent [19]

Keiles

[11] 4,141,066
[45] Feb. 20, 1979

[54] PROCESS CONTROL SYSTEM WITH BACKUP PROCESS CONTROLLER

[75] Inventor: Yoel Keiles, Havertown, Pa.
[73] Assignee: Honeywell Inc., Minneapolis, Minn.
[21] Appl. No.: 832,879
[22] Filed: Sep. 13, 1977
[51] Int. Cl.² .................. G06F 15/46; G06F 11/00
[52] U.S. Cl. .................. 364/119; 235/303.3; 364/200
[58] Field of Search .............. 364/100, 101, 102, 119, 364/200 MS File, 900 MS File; 235/303.3, 303.4

[56] References Cited

U.S. PATENT DOCUMENTS

| | | | |
|---|---|---|---|
| 3,303,474 | 2/1967 | Moore et al. | 235/303.3 X |
| 3,377,623 | 4/1968 | Reut et al. | 364/100 X |
| 3,444,528 | 5/1969 | Lovell et al. | 235/303.3 X |
| 3,636,331 | 1/1972 | Amrehn | 235/303.3 X |
| 3,786,433 | 1/1974 | Notley et al. | 235/303.3 X |

Primary Examiner—Joseph F. Ruggiero
Attorney, Agent, or Firm—Laurence J. Marhoefer; Lockwood D. Burton; Mitchell J. Halista

[57] ABSTRACT

A process control system having a backup controller which is substituted for one of a plurality of primary process controllers upon the detection of a failure of one of the primary process controllers. The substitution of the backup controller is controlled by a backup director which is arranged to sense the operation of a primary process controller and to transfer the operating data from the failed controller into the backup controller to enable the backup controller to take over the operations being performed by the failed controller.

11 Claims, 3 Drawing Figures

PROCESS CONTROL SYSTEM WITH BACKUP PROCESS CONTROLLER

CROSS REFERENCE TO RELATED APPLICATIONS

Subject matter shown but not claimed herein is shown and claimed in a copending application of James A. Hogan, Ser. No. 832,880, filed on even date herewith and assigned to the same assignee as the present application.

BACKGROUND OF THE INVENTION

1. Field of the Invention

The present invention relates to process controllers. More specifically, the present invention is directed to a process control system having a backup controller to be used as a substitute for a failed primary controller.

2. Description of the Prior Art

The use of process controllers to control the functioning of an industrial process is well-known in the art and involves a monitoring an adjustment of many critical process variables. In order to improve reliability of the operation of such process controllers inasmuch as the failure of an on-line industrial process controller would produce a catastrophic effect in the monitored and controlled industrial process, it is desirable to provide a means for counteracting failure of a process controller as quickly as possible. While a manual substitution by an operator of known good controller for a failed controller would quickly affect a repair, such a substitution is often impractical to go into the remote location of many industrial process controllers which are generally located at the site of the industrial process being monitored and controlled rather than in a convenient centralized location. Further, in many continuous industrial processes it is desirable to maintain the operation of the industrial process rather than effecting a shut-down following a detection of a failed process controller. Finally, the contemporary use of digital computer apparatus and techniques in the process control field involves the use of digital communication systems to the process controller as well as digital output signals from the process controllers to the digital communication system. Thus, the digital controller must respond to a digital identification, or communication, signal as well as providing digital process control and a monitoring information to the digital communication system. Accordingly, a substituted process controller must be prepared to assume all of the functions of the failed controller as well as being responsive to the communication system digital address code for the failed controller.

SUMMARY OF THE INVENTION

An object of the present invention is to provide improved process control system having a fully substitutable backup controller.

A further object of the present invention is to provide an improved process control system having a backup process controller having a backup capability for one of a plurality of primary process controllers.

In accomplishing these and other objects, there has been provided, in accordance with the present invention, a process control system having a plurality of primary process controllers arranged to receive and send data onto a digital data highway. A backup director is also connected to the data highway and to the process controllers to sense the failure of a primary process controller. The backup director, upon the sensing of a failure of a primary process controller, transfers the process information stored in the memory of the failed controller into a memory of a backup controller which is also connected to the data highway. Concurrently, the failed primary controller is disconnected from the data highway and the process inputs and outputs of the backup controller are substituted for those of the failed controller. The highway address of the failed controller is transferred to the backup controller to enable the backup controller to respond to highway addresses directed to the failed controller.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
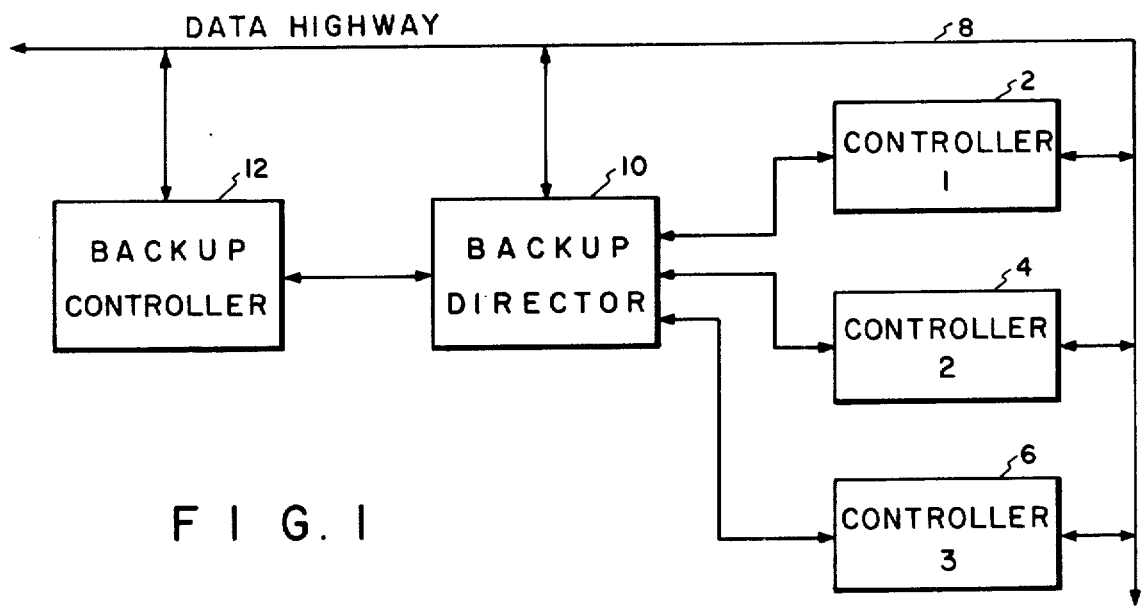
FIG. 1 is a block diagram of a process control system embodying the present invention and FIG. 2 is a block diagram of a backup director and backup controller arrangement suitable for use in the process control system shown in FIG. 1.

Referring to FIG. 1 in more detail, there is shown a block diagram of a process control system embodying the present invention and including a plurality of conventional process controllers 2, 4, and 6 arranged as primary, or regular, controllers to send and receive digital signals from a data highway 8 as well as controlling the industrial process associated therewith. Such process controllers are well-known in the art and may include a digital processor, or digital computer, having a program and data memory which may be divided between a read-only-memory (ROM) and a data memory such as a random-access-memory (RAM). The digital processor would include a central processing unit (CPU) for reading the stored data and using the stored programs, or algorithms, to direct the processing of the data derived from the industrial process being monitored to produce control signals for control elements, e.g., valves, in the industrial process. The storage of computer programs and data in RAM's and ROM's, the reading of stored programs and data, the use of data and address busses for transmitting digital data and the operation of digital logic circuits in the CPU including the generation of CPU strobe, or timing, signals are all conventional digital computer techniques performed by known CPU products. Further, the writing of programs, or routines, including microprograms and branching routines for directing the CPU operation to achieve desired conventional functions with a predetermined CPU and associated hardware system is also well-known in the art. In other words, the use of a standard CPU product such as the CP-1600 manufactured by General Instruments Corp. of Hicksville, N.Y., along with peripheral ROM and RAM elements and a suitable stored program will provide the necessary CPU operation for the primary controllers, 2, 4, and 6, the backup controller 12 and the backup director 10. Accordingly, the further elaboration of the details of these known techniques beyond the discussion herein is believed to be unnecessary.

A data highway interface circuit including a characterized address circuit is associated with each of the primary controllers 2, 4, and 6 whereby a controller can be selectively addressed over the data highway from a central control room. The conventional address circuit includes an array of electrical circuits interconnected by electrical jumpers which are manually manipulated to provide each controller with a unique highway address. The highway interface circuit may also include digital logic circuits for sensing a highway address from the data highway 8 corresponding to the respective controller being addressed and for transferring digital data between the digital processor within the controller and the data highway 8. Additionally, the primary process controllers 2, 4, and 6 are connected to the industrial process being controlled by any suitable means (not shown) for providing output signals to control the operation of the industrial process by receiving process signals, performing conventional analog to digital conversions and vice versa, and operating on the digital data in accord with programs stored in the processor memory as discussed above.

Figure 2:
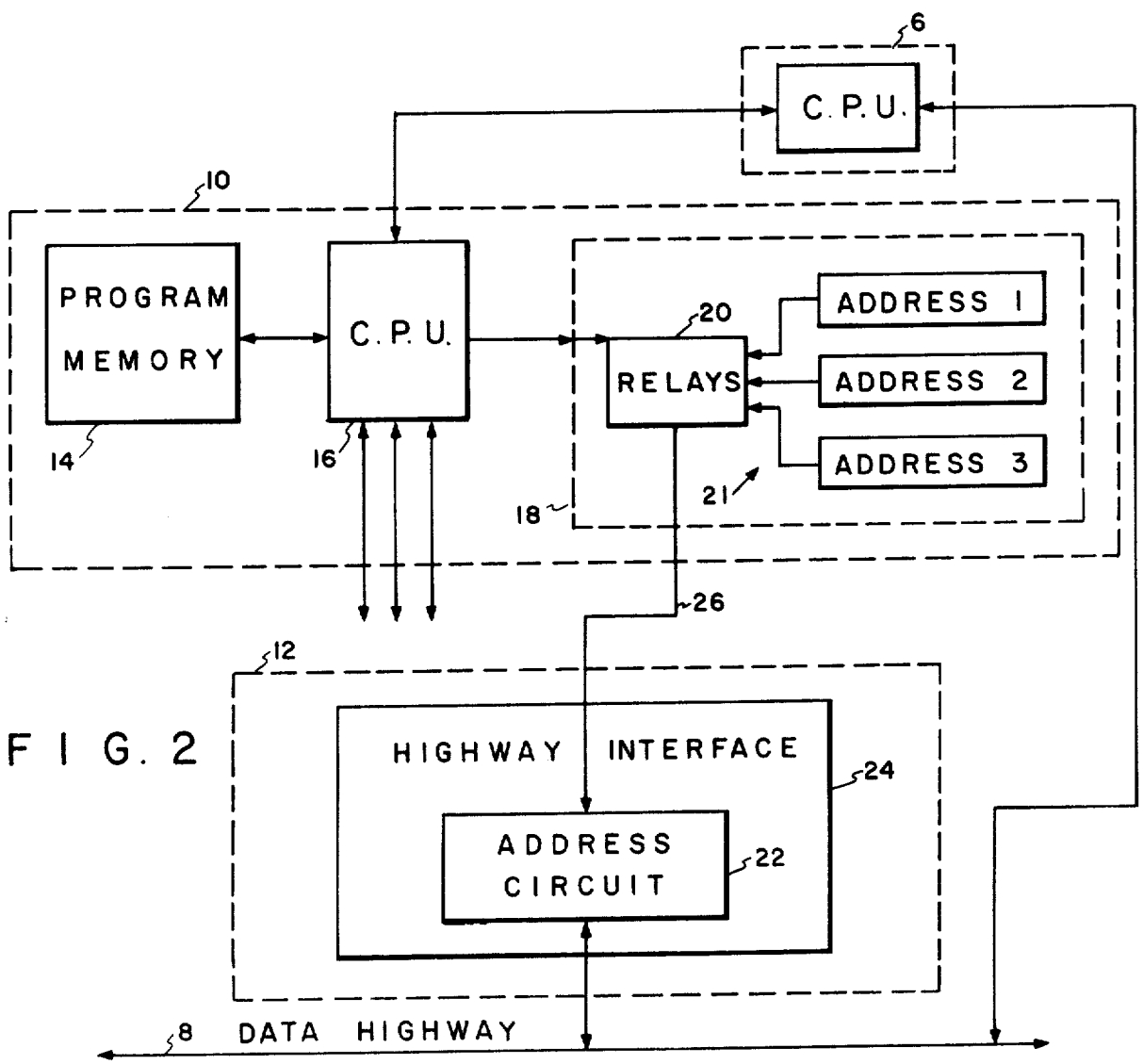

A backup director 10 is connected to each of the process controllers 2, 4, and 6 to sense the operation thereof. A suitable circuit for the backup director is shown in FIG. 2 and described more fully hereinafter. A backup process controller 12 is connected to the data highway 8 and to the backup director 10. The backup controller 12 is similar to the primary controllers 2, 4, and 6 and is interchangeable therewith to avoid the necessity for having two types of controllers. However, as shown in FIG. 2, the electrical jumpers for the highway address in the backup controller 12 are replaced with a multi-pin connector (not shown) and a multi-wire cable 26 providing individual connections from the jumper panel in the address circuit 22 to a relay, or switch, matrix 18. Thus, the selective operation of a plurality of relays 20 in the matrix 18 is effective to connect a jumper panel to an address memory 21 in the back-up director 10 wherein a plurality of jumper panels with respective jumper arrangements of highway addresses of the primary controllers 2, 4, and 6 are provided. Thus, the jumper pattern in the address memory 21 selected by the relay matrix 20 is connected back to the jumper panel in the address circuit 22 in the backup controller 12 to provide a highway address as if jumpers had been inserted in the address circuit jumper panel in the backup controller 12. The relays 20 which may be solid state switching devices which are addressable, or selectable, by digitally coded signals from the CPU 16. Such devices are thus used to perform circuit switching operations in providing hard wired connection transfers between the failed controller and the backup controller.

The backup director 10, is, thus, arranged to insert the highway address of a failed primary controller into the backup controller 12. In other words, the backup controller 12 is normally not provided with a highway address in its highway address circuit 22 whereby the highway address signals on a data highway 8 are effective to produce a response only from the primary process controllers 2, 4, and 6 which have been initially provided with corresponding addresses in their respective highway address circuits. The backup director 10 is arranged to sequentially monitor each of the primary controllers 2, 4, and 6 to detect a failure thereof. The stored programs in the primary controllers 2, 4, and 6 can be used to provide a failure indication by normally providing a repetitive controller output signal. Upon a failure of a primary process controller, i.e., controllers 2, 4, and 6, the backup director 10 is arranged to detect such a failure by monitoring the operation of the primary controllers 2, 4, and 6 and to insert the highway address of the failed controller into the backup controller 12. Also, the process input and output connections of the failed controller may either both be disconnected or only the output connections disconnected and the process input and output connections applied to the backup controller 12 to enable the backup controller 12 to receive the process input signals and apply process control output signals formerly associated with the failed controller. Further, following such a controller failure, the highway address interface of the backup controller is enabled by the backup director 10 while the highway interface circuit 24 of the backup controller 12 is disabled to effectively disconnect the failed controller from the data highway 8 whereby the backup controller 12 functions as a full substitution for the failed controller.

Figure 3:
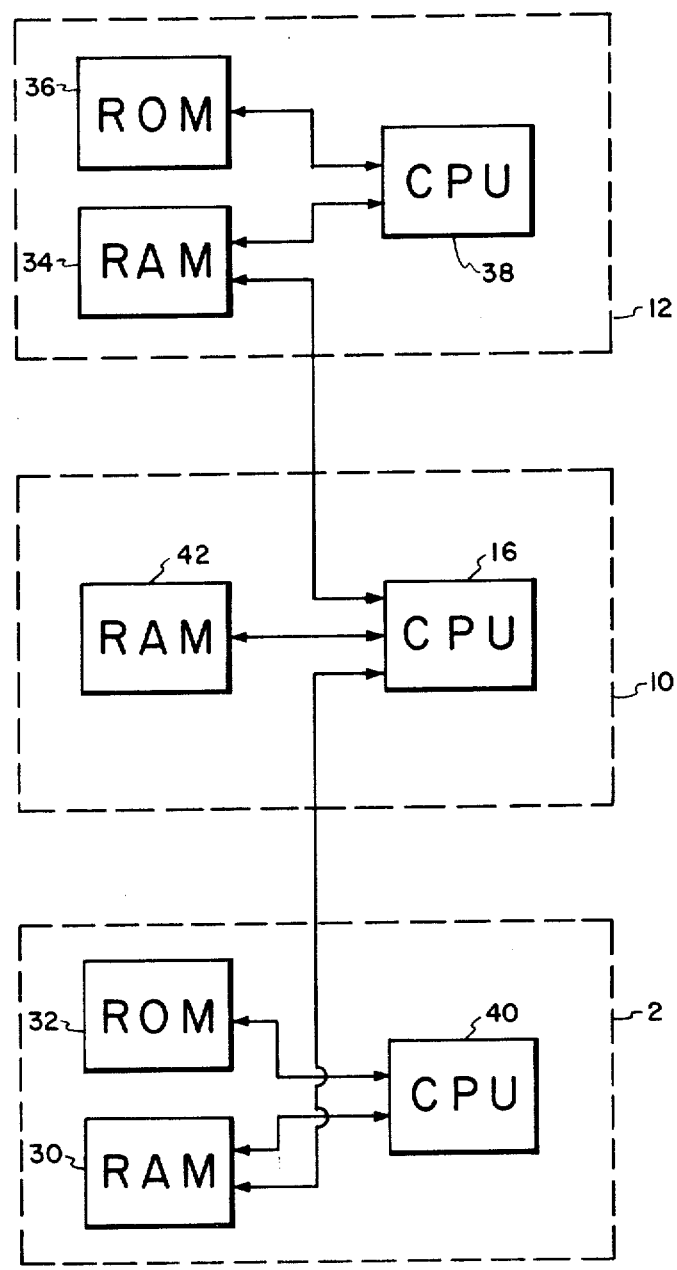
FIG. 3 is a block diagram of a memory arrangement for the process control system shown in FIG. 1.

An additional failure detection operation involves the fact that the failed controller has a random access memory (RAM), e.g., RAM 30 and a read-only-memory (ROM), e.g., ROM 32 which store respective programs and data. As shown in FIG. 3, the backup controller 12 has similar memory devices, i.e., RAM 34 and ROM 36. The ROM memory in the primary and backup controllers stores the same programs or software to provide operating instructions to the backup controller as are stored in the ROM of the primary controllers. Thus, the computational steps or algorithms which are used to control the operation of the CPU 38 in the backup controller 12 and the CPU's primary controllers 2, 4, and 6, e.g., CPU 40 are the same in order to enable the backup controller 12 to takeover the operation of one of the failed controllers. However, the RAM information stored in the primary controllers 2, 4, and 6 is dependent on the particular use or operation which the primary controller is performing. Thus, the information stored in the RAM of the primary controllers 2, 4, and 6 is usually different for each primary controller and is arranged, or configured, to be compatible with the particular industrial process being monitored and controlled. The backup controller 12 on the other hand has a RAM 34 which is devoid of this information inasmuch as the backup controller is not ordinarily being used for monitoring and controlling an industrial process and must be adaptable for substitution for any of the primary controllers 2, 4, and 6. Accordingly, upon the detection of a failure of one of the primary process controllers 2, 4, or 6, the information in the RAM, e.g., RAM 30, of the failed controller must be transferred to the RAM 34 of the backup controller 12 to enable the backup controller 12 to perform the same operations on the process input signals which are also transferred to the backup controller 12 and to provide the appropriate, or correct, output signals to the industrial process as were formerly provided by the failed controller.

In order to monitor the operation of each of the primary controllers 2, 4, and 6, the backup director 10 may use a diagnostic routine, or program, in its software package which would sequentially write information into an unused portion of the RAM in each of the controllers 2, 4, and 6. The stored information is then read back into the RAM 42 of the backup director 10 and is compared with the information which had been originally supplied to the primary controller RAM. A suitable dual port memory cell for use in the RAM's of the backup controller 12, the backup director 10 and the primary controllers 2, 4, and 6 is shown in the U.S. Pat. No. 3,968,480 of Jeffrey P. Stein. Upon the detection of an error between the compared digital values, the primary controller is assumed to have failed. Accordingly, the software, or program, of the backup controller is arranged to switch, or branch, to a program routine which proceeds to substitute the backup controller 12 for the failed primary controller. This substituted routine includes the operation of the relays 20 for transferring the address from the address memory 21 to the address circuit 22 in the highway interface 24 of the backup controller 12 and the transfer of the configuration information from the RAM of the failed controller to the RAM 42 of the backup controller 12. The RAM information is sequentially read out of the failed controller under control of the CPU 16 in the backup director 10 and is stored in similar memory locations in the RAM 34 of the backup controller 12. A typical transfer time of the RAM data would be approximately one second. The diagnostic phase of the operation of the backup controller 10 is, of course, controlled by the program routines stored in its memory, ROM and RAM. These may include other checking and monitoring functions including a self-check of the back-up controller 10. Another diagnostic routine could be directed to checking that the data in the primary controller RAM is being properly updated, or altered to reflect current process needs. Thus, the data from a preselected RAM location actually being used by the primary controller to store process data is read by the backup director at successive intervals and is successively compared with a stored initial value in the backup director RAM 42. If the data continues unchanged, the backup director 10 could be programmed to interpret this condition as a failure of the process controller and either initiate a transfer of the backup controller 12, prevent a transfer on the basis of incorrect RAM data or signal an operator that a possible controller problem exists as well as identifying the particular suspect controller.

Further, the operation of the relays 20 is also effective to switch the process inputs and outputs to the backup controller 12 to enable the backup controller 12 to assume the functions of the failed controller. Additionally, the process inputs and outputs may be disconnected from the failed controller or only the process outputs may be disconnected while the process inputs may be left connected to the failed controller inasmuch as the disconnecting of the outputs prevents the failed controller from having any further effect on the industrial process being monitored and controlled by the substituted backup controller. Thus, the backup controller 12 is provided with the highway address of the failed controller to enable the backup controller 12 to respond to address signals on a data highway 8 which would have formerly been directed to the failed controller and to respond to the industrial process formerly being monitored and controlled by the failed controller by virtue of the transferred RAM data. Finally, in order to prevent any interference between the failed controller and the backup controller 12 on the data highway, the highway interface circuit 24 of the backup controller is enabled by the relays 20 while the highway interface circuit of the failed controller is disabled by the operation of the relays 20.

The relays 20 can also be used to provide additional functions such as lighting an alarm signal to indicate to an operator that a backup controller has been substituted for a failed controller. Such an alarm indication would alert an operator to the need to either repair or replace the failed controller and to return the process control to the repaired or replaced primary controller. Since the failed controller is replaced by a controller having the same highway address, the address circuit of the backup controller 12 can subsequently be disabled by the operator by manually deenergizing the relays 20 to remove the highway and address from the backup controller 12 and to transfer the process inputs and outputs which had been applied to the backup controller 12 to the repaired or replaced process controller. It should be noted that such a restoration operation may also be achieved by digital control signals supplied over the data highway 8 from a central control room since the backup director 10 is connected to the data highway 8 to respond to such supervisory signals obtained therefrom.

The overall operation of the process control system is obviously unaffected by the aforesaid controller substitution which maintains the proper functioning of the corresponding industrial process. Thus, the backup controller 12 is provided with a highway address of the failed controller as well as the RAM information to enable it to continue monitoring and control based on its ROM stored programs of the industrial process formerly under the aegis of the failed controller. The embodiment of the invention shown in FIGS. 1 and 2 is illustrated with three primary controllers 2, 4, and 6, it is obvious that such a configuration information and address transfer operation could be used for a number of primary controllers either greater, e.g., 8 or less than 3, e.g., 1. The address memory 21 would, of course, be altered to accommodate the number of addresses to be stored in the actual process control system to correspond to the number of primary process controllers being monitored by the backup controller 10. However, it should be noted that the present invention has its greatest utility in monitoring and control of a plurality of primary controllers where the number "n" of the primary controllers is greater than 1. In this embodiment, the ability of the present invention to substitute a backup controller for the failed controller in the "n" number of primary controllers is indicative of the greatly increased reliability of the process control system of the present invention.

Accordingly, it may be seen that there has been provided, in accordance with the present invention, a process control system having a backup process controller arranged to be substituted for a failed one of a plurality of primary process controllers. Further, the present invention can respond to a failure in a time which is beyond the capability of a human operator. For example, the monitoring of eight primary controllers and the switching of the backup controller for a failed primary controller can be achieved in approximately one second. It should also be noted that since the switching of the backup controller is automatic and dependent on the communication links among the backup director, backup controller and the monitored primary controllers, the substitution operation is not affected by the data highway integrity whereby the reliability of process protection is enhanced particularly in a so-called distributed control system having many remotely located primary controllers.

The embodiments of the invention in which an exclusive property or privilege is claimed are defined as follows:

1. A process control system comprising
    at least one primary process controller, said controller having a random access memory for storing process data pertaining to a process being monitored and controlled by said controller and a read only memory storing control information to be used in handling the process signals applied to the process controller,
    a backup controller, said backup controller having a random access memory substantially devoid of stored process data and a read only memory storing substantially the same control information as said read only memory in said primary process controller, and
    a backup director connected to said primary controller and to said backup controller and including control means responsive to a failure of said primary controller for transferring said process data from said random access memory in said primary controller to said random access memory in said backup controller.

2. A process control system as set forth in claim 1 and including a data highway connected to said primary controller and said backup controller and wherein said backup director includes means responsive to a failure of said primary controller for substituting a data highway address of said primary controller into a highway address means of said backup controller.

3. A process control system as set forth in claim 2 and further including disabling means responsive to said control means for disabling said highway address means of said primary controller upon the detection of a failure of said primary controller.

4. A process control system as set forth in claim 1 and including a plurality of said primary process controllers and wherein said backup director is also connected to said plurality of primary process controller and is responsive to a failure of any of said plurality of primary process controllers for transferring said process data from said random access memory in a failed one of said plurality of primary process controller to said random access memory in said backup controller.

5. A method of substituting a backup controller for a failed primary controller comprising the steps of detecting the failure of a primary controller, and transferring information from a random access memory of the failed controller into a random access memory of the backup controller.

6. A method as set forth in claim 5 and including the further step of substituting the address of the failed controller into the backup controller.

7. A method as set forth in claim 5 and including the further step of concurrently disabling an address circuit of the primary controller.

8. A method as set forth in claim 7 and including the further steps of removing the address of the failed controller from the backup controller, re-enabling the address circuit of the failed controller and retransferring the data from the random access memory of the backup controller to the random access memory of the primary controller following a repair of the failed controller.

9. A method as set forth in claim 5 including the steps of monitoring the operation of a plurality of primary controllers, detecting the failure of one of the plurality of primary controllers and transferring data from the random access memory of the failed one of the plurality of primary controllers to the random access memory of the backup controller.

10. A method as set forth in claim 9 and including the further steps of selecting an address from an address memory corresponding to the failed controller and substituting the selected address into the backup controller.

11. A method as set forth in claim 10 and including the further step of concurrently disabling an address circuit of the failed primary controller.

* * * * *